May 29, 1934.　　　A. L. KNAPP　　　1,960,381

FASTENING DEVICE

Filed Oct. 22, 1930

Inventor

ARCHER L. KNAPP

By

Attorney

Patented May 29, 1934

1,960,381

UNITED STATES PATENT OFFICE 1,960,381

FASTENING DEVICE

Archer L. Knapp, Detroit, Mich., assignor to Packard Motor Car Company, Detroit, Mich., a corporation of Michigan Application October 22, 1930, Serial No. 490,483

7 Claims. (Cl. 85—50)

This invention relates to fastening devices and more particularly to a nut holding device.

It is a general object of the present invention to provide a novel and improved form of nut holding means.

More particularly it is an object of the invention to provide a device which will hold a nut in a given position in an opening in a body so that a screw from the opposite side of the body may be threaded into the nut.

Another object of the invention consists in providing a device of the above description which is of simple design, durable and inexpensive.

An important feature of the invention resides in the provision of a nut holding device which may be fabricated from a single sheet of metal.

Other and further features and objects of the invention will be more apparent to those skilled in the art upon a consideration of the accompanying drawing and the following specification wherein is disclosed several exemplary embodiments of the invention with the understanding, however, that such changes may be made therein as fall within the scope of the appended claims, without departing from the spirit of the invention.

The present invention deals particularly with a device for holding the nut while bolting two members together, where the nut cannot be held by the operator when the members are in place. The invention is particularly shown and described as it is used in bolting together two blocks when one is covered by a metal sheath or is otherwise inaccessible when installed.

Figure 2:
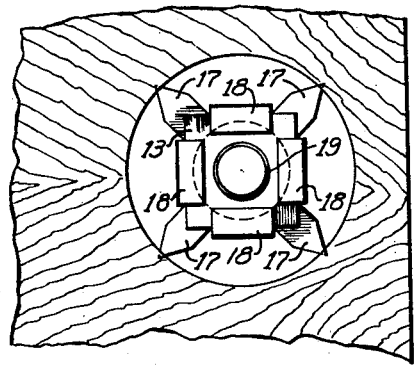
Fig. 2 is a view in front elevation of the nut and nut holding device as it appears before a cover plate, shown in Figure 1, has been applied:
Figure 1:
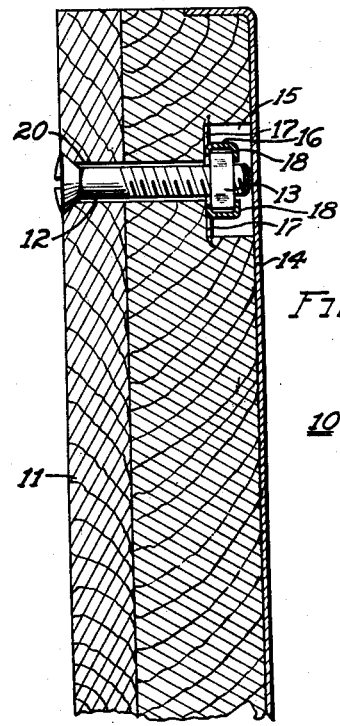
Figure 1 is a view, partly in side elevation and partly in section, of the device as it is utilized for holding a nut in proper position, so that a bolt may be engaged with the nut to hold two members together.
Figure 3:
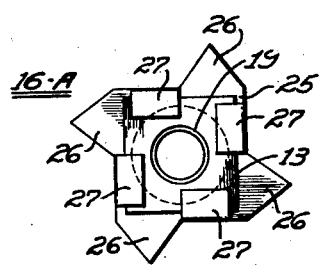
Fig. 3 is a view in elevation of another embodiment of the invention.
Figure 4:
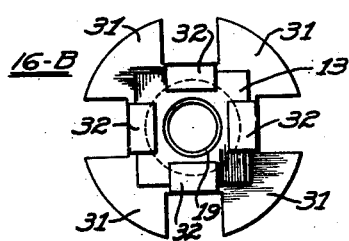
Fig. 4 is a view in front elevation of still another embodiment of the invention.

Referring now to the drawing for a more complete disclosure of this invention, and particularly to Figures 1 and 2, there is shown at 10 a block such as the pillar of a motor vehicle body to which another block 11 is to be fastened by means of the screw 12 and nut 13 which are located in alined bores in the two blocks when the two blocks are installed. A metal cover or trim 14 is located over the nut.

The operator assembling the blocks cannot hold the nut in proper position for engagement by the screw when the blocks are installed because of panel 14, and so, in order to hold the nut, the block 10 is counterbored and a supporting device constructed according to the invention is utilized in the counterbore 15.

The nut holding device 16, in one embodiment of the invention (Figs. 1 and 2), is in the form of a rectangular plate drilled at its center to permit passage of the bolt. The corners of the rectangle are defined by out-thrust, pointed prongs 17 of sufficient length to engage the wall of the counterbore 15 to center the nut and keep the holder from turning, and the sides of the rectangle are defined by up-turned lugs 18 bent inwardly to hold the nut in place so that the threaded opening 19 of the nut is directly in position on a line with the bore 20 so that when the screw is inserted in the bore and turned it will immediately be threaded into the nut.

In another embodiment of the invention the nut holding device 16a is in the form of a rectangular plate 25 with triangular prongs 26 projecting outwardly at right angles from a half of each edge to engage the wall of the counterbore to center the nut and keep the holder from turning. Lugs 27 project upwardly and inwardly from the other half of each edge of the plate to engage the nut and the rectangular plate is threaded at its center to permit passage of the bolt. This form of the device, because the prongs do not project radially into the wall of the counterbore, resists rotation in one direction more than in the other and, therefore, the prongs and lugs may be so arranged that the holder resists rotation when the screw is being tightened but will turn with the screw when the screw is being loosened, or vice versa.

In still another embodiment of the invention the base of the holder 16b is disk-shaped and is drilled to permit passage of the bolt therethrough. Sectors of the base constitute prongs 31 for engaging, that is partially embedded in, the wall of the counterbore to keep the holder from turning, and up-struck lugs 32, punched from the disk, are bent inwardly over the nut to hold it in place and properly locate it.

In the operation of securing one member to another by means of a screw and nut where it will be difficult or impossible for the operator to hold the nut when the members are in place, an opening of suitable dimensions is drilled in the member in which the nut is to be located and a nut holder, constructed according to the invention, and nut inserted in the opening. The members may then be placed in their proper position. A screw is then inserted in the opening and turned until the nut is threaded on the screw and the members bolted together. It is apparent that the invention offers a simple and inexpensive solution of a difficult problem.

Having thus described the invention what is claimed as new and desired to be secured by Letters Patent is:

1. In combination with a body having a counterbored opening, a screw in the opening, and a nut for the screw, a device for holding the nut in a position to be threaded on the screw comprising a rectangular plate having triangular prongs projecting outwardly at right angles from a half of each edge to engage the wall of the counterbored opening, and lugs projecting upwardly from the other half of each edge to engage the nut.

2. A device for holding a nut in a selected position with reference to a body having an opening therein of greater minimum diameter than the maximum diameter of the nut comprising a rectangular plate having triangular prongs projecting outwardly at right angles from half of each edge for imbedding engagement with the body and lugs projecting upwardly from the other half of each edge to hold the nut.

3. The combination with a body having a counter-bored opening, a screw extending into the opening, and a nut in the opening on the screw, of a device for holding the nut in adjusted position relative to the opening comprising a plate having a plurality of prongs associated with each edge, some of said prongs projecting radially and lying substantially in a plane coinciding substantially with the bottom of the nut and of the opening and being embedded in the walls of the opening to locate the holder axially and circumferentially in the opening, and the remainder of said prongs projecting axially of the screw from each edge, to engage the nut.

4. The combination with a body having a counter-bored opening, a threaded member projecting into the opening, and a nut on that portion of the threaded member which extends into the opening, of a device for holding the nut in adjusted position on the threaded member comprising a polygonal plate through which the threaded member extends, said plate having triangular prongs projecting outwardly at right angles from a portion of each edge to engage the wall of the counter-bored opening, and lugs on the plate intermediate the prongs projecting axially of the threaded member to engage the sides of the nut.

5. In combination with a body having a counter-bored opening, a screw in the opening, and a nut for the screw of lesser maximum diameter than the minimum diameter of the opening, a device for holding the nut in a position to be threaded on the screw comprising a flat flexible metal plate including peripheral prongs partially embedded in the wall of the counterbored opening to locate the holder, and lugs bent from the plate into engagement with the faces of the nut, said plate being of a size such that the prongs must be sprung prior to insertion into the counter-bored opening and then released to become embedded in the walls.

6. In combination with a body having a counter-bored opening, a screw in the opening, and a nut for the screw of lesser maximum diameter than the minimum diameter of the opening, a device for holding the nut in a position to be engaged by the screw comprising a flexible metal disk having portions partially embedded in the wall of the counter-bored opening, and lugs bent from the disk for holding the nut.

7. In combination with a body having an opening therein, a screw, and a nut for the screw, a device for positioning the nut in the opening comprising a flexible plate having a plurality of prongs projecting radially therefrom, and means on the plate for holding the nut, said prongs being partially embedded in the wall of the opening and securing the plate against displacement axially of the opening.

ARCHER L. KNAPP.